US012557936B2

(12) United States Patent
Steiner

(10) Patent No.: US 12,557,936 B2
(45) Date of Patent: Feb. 24, 2026

(54) METHOD FOR PREPARING A BEVERAGE, PREFERABLY MILK FROTH OR HOT MILK

(71) Applicant: STEINER AG WEGGIS, Weggis (CH)

(72) Inventor: Adrian Steiner, Weggis (CH)

(73) Assignee: STEINER AG WEGGIS, Weggis (CH)

( * ) Notice: Subject to any disclaimer, the term of this patent is extended or adjusted under 35 U.S.C. 154(b) by 683 days.

(21) Appl. No.: 17/596,659

(22) PCT Filed: May 29, 2020

(86) PCT No.: PCT/EP2020/065061
§ 371 (c)(1),
(2) Date: Dec. 16, 2021

(87) PCT Pub. No.: WO2020/254092
PCT Pub. Date: Dec. 24, 2020

(65) Prior Publication Data
US 2022/0296031 A1 Sep. 22, 2022

(30) Foreign Application Priority Data
Jun. 17, 2019 (CH) ..................................... 00816/19

(51) Int. Cl.
*A47J 31/44* (2006.01)
*A23C 9/152* (2006.01)
(Continued)

(52) U.S. Cl.
CPC ......... *A47J 31/4485* (2013.01); *A23C 9/1524* (2013.01); *A47J 31/4489* (2013.01);
(Continued)

(58) Field of Classification Search
CPC .. A47J 31/4485; A47J 31/4489; A47J 31/468;
A47J 31/5253; A47J 31/40; A47J 31/4403; A23C 9/1524; A23C 2210/30
(Continued)

(56) References Cited

U.S. PATENT DOCUMENTS 4,620,953 A * 11/1986 Silla ..................... A47J 31/4485
426/477
4,800,805 A * 1/1989 Mahlich .............. A47J 31/4489
99/323.1
(Continued)

FOREIGN PATENT DOCUMENTS

CN 101401696 A * 4/2009
CN 104797176 A * 7/2015 ............ A47J 31/401
(Continued)

*Primary Examiner* — Drew E Becker
*Assistant Examiner* — Luis Eugenio Diou Berdecia
(74) *Attorney, Agent, or Firm* — Brian Roffe

(57) ABSTRACT
Method for producing milk froth, in particular for preparing beverages containing milk froth using coffee machines. The beverage, preferably cold milk, is at least partially introduced into a container before the preparation. The introduced beverage, in the container positioned on a placement surface of a station, is guided through at least one line, which leads away from the station, to a device for preparing milk froth or hot milk. The beverage is subsequently led back into the container, and this circulation is repeated until the beverage has a certain temperature and/or consistency. Using this method, a container can be used by operating personnel in a conventional way for preparation of the beverage, because the beverage can thus be prepared manually and specifically in accordance with the desires of the guest, while the milk froth or the like can be produced and served with constant and high quality.

19 Claims, 4 Drawing Sheets

(51) Int. Cl.
    *A47J 31/46*        (2006.01)
    *A47J 31/52*        (2006.01)
(52) U.S. Cl.
    CPC ........... *A47J 31/461* (2018.08); *A47J 31/468*
        (2018.08); *A47J 31/5253* (2018.08); *A23C*
        *2210/30* (2013.01)
(58) Field of Classification Search
    USPC ................................... 426/231, 569; 99/453
    See application file for complete search history.

(56) References Cited

U.S. PATENT DOCUMENTS

| | | | | |
|---|---|---|---|---|
| 4,852,474 A * | 8/1989 | Mahlich | .............. | A47J 31/4489 |
| | | | | 99/323.1 |
| 4,949,631 A * | 8/1990 | Fregnan | .............. | A47J 31/4485 |
| | | | | 99/452 |
| 5,207,148 A * | 5/1993 | Anderson | ............. | A47J 31/525 |
| | | | | 99/290 |
| 5,372,061 A * | 12/1994 | Albert | ..................... | A47J 31/46 |
| | | | | 99/281 |
| 5,464,574 A * | 11/1995 | Mahlich | .............. | A47J 31/4489 |
| | | | | 261/DIG. 16 |
| 5,473,972 A * | 12/1995 | Rizzuto | ............... | A47J 31/4403 |
| | | | | 99/290 |
| 5,476,033 A * | 12/1995 | Locati | ..................... | A47J 31/40 |
| | | | | 99/287 |
| 5,498,757 A * | 3/1996 | Johnson | .................. | A47J 31/54 |
| | | | | 99/323.1 |
| 5,549,036 A * | 8/1996 | Hourizadeh | .......... | A47J 31/469 |
| | | | | 99/302 R |
| 5,931,080 A * | 8/1999 | Roure Boada | ........ | A47J 31/469 |
| | | | | 99/323.1 |
| 6,006,654 A * | 12/1999 | Pugh | ................... | A47J 31/4485 |
| | | | | 99/323.1 |
| 6,158,328 A * | 12/2000 | Cai | ......................... | C02F 1/003 |
| | | | | 99/323.1 |
| 6,901,848 B2 * | 6/2005 | Beretta | ............... | A47J 31/4489 |
| | | | | 99/452 |
| 7,550,169 B2 * | 6/2009 | Green | ................. | A47J 31/4485 |
| | | | | 99/323.1 |
| 7,913,614 B2 * | 3/2011 | Fukushima | ......... | A47J 31/4485 |
| | | | | 99/452 |
| 8,007,599 B2 * | 8/2011 | Coccia | ............... | A47J 31/4485 |
| | | | | 99/290 |
| 8,357,416 B2 * | 1/2013 | Schindler | ............ | A47J 31/4485 |
| | | | | 426/511 |
| 8,495,950 B2 | 7/2013 | Fedele et al. | | |
| 8,944,287 B2 * | 2/2015 | Reyhanloo | .............. | B01F 33/40 |
| | | | | 99/453 |
| 2003/0106433 A1 * | 6/2003 | Oldani | ................ | A47J 31/4485 |
| | | | | 99/452 |
| 2005/0112262 A1 * | 5/2005 | In Albon | ............ | B65D 81/3261 |
| | | | | 426/569 |
| 2005/0115419 A1 * | 6/2005 | Oldani | ................ | A47J 31/4485 |
| | | | | 99/453 |
| 2005/0155494 A1 * | 7/2005 | Brouwer | ............... | A47J 31/467 |
| | | | | 99/279 |
| 2005/0233043 A1 * | 10/2005 | Dirren | ................. | A47J 31/4485 |
| | | | | 426/569 |
| 2006/0286262 A1 * | 12/2006 | Stearns | ................... | A47J 31/41 |
| | | | | 426/596 |
| 2007/0000944 A1 * | 1/2007 | Cahen | ................. | A47J 31/4485 |
| | | | | 222/150 |
| 2008/0017042 A1 * | 1/2008 | Almblad | ................. | A47J 31/10 |
| | | | | 99/280 |
| 2009/0095163 A1 * | 4/2009 | Sala | ...................... | A47J 31/469 |
| | | | | 99/323.3 |
| 2009/0293733 A1 * | 12/2009 | Martin | .................. | G07F 13/065 |
| | | | | 99/280 |
| 2010/0107891 A1 * | 5/2010 | Vanderstegen-Drake | .................. | |
| | | | | A47J 31/60 |
| | | | | 99/323.1 |
| 2010/0212508 A1 * | 8/2010 | Buttiker | .............. | A47J 31/4485 |
| | | | | 99/290 |
| 2011/0005407 A1 * | 1/2011 | Reyhanloo | .............. | A47J 31/60 |
| | | | | 134/22.12 |
| 2011/0014329 A1 * | 1/2011 | Turi | .................... | A47J 31/4485 |
| | | | | 99/453 |
| 2011/0108570 A1 * | 5/2011 | Jarisch | ................ | A47J 41/0094 |
| | | | | 222/23 |
| 2011/0212229 A1 | 9/2011 | Mclaughlin et al. | | |
| 2011/0256289 A1 * | 10/2011 | Steiner | ............... | A47J 31/4485 |
| | | | | 426/523 |
| 2011/0311694 A1 * | 12/2011 | Broennimann | ..... | A47J 31/4485 |
| | | | | 99/453 |
| 2012/0305111 A1 * | 12/2012 | Peretti | ..................... | A47J 31/46 |
| | | | | 137/560 |
| 2013/0040028 A1 * | 2/2013 | Doppe | ................. | A47J 31/4485 |
| | | | | 99/452 |
| 2013/0112083 A1 * | 5/2013 | Douma | .............. | A47J 31/4489 |
| | | | | 99/453 |
| 2013/0160657 A1 * | 6/2013 | Mahlich | .............. | A47J 31/4485 |
| | | | | 99/300 |
| 2013/0276636 A1 * | 10/2013 | Rithener | ............. | A47J 31/4485 |
| | | | | 99/291 |
| 2013/0319259 A1 * | 12/2013 | Ait Bouziad | ....... | A47J 31/4489 |
| | | | | 99/452 |
| 2014/0044847 A1 * | 2/2014 | Hellmaier | ............. | B01F 35/145 |
| | | | | 99/323.1 |
| 2014/0322412 A1 * | 10/2014 | Buchholz | ................. | A23C 7/00 |
| | | | | 99/452 |
| 2014/0322415 A1 * | 10/2014 | Buchholz | ................. | A01J 11/04 |
| | | | | 99/452 |
| 2015/0150408 A1 * | 6/2015 | Schlee | .................. | B01F 25/312 |
| | | | | 99/453 |
| 2015/0201796 A1 * | 7/2015 | Kuempel | ............... | A47J 31/52 |
| | | | | 99/283 |
| 2015/0327715 A1 * | 11/2015 | Steiner | ............... | A47J 31/4485 |
| | | | | 99/323.3 |
| 2016/0135474 A1 * | 5/2016 | Vetterli | ................... | B01F 23/20 |
| | | | | 99/452 |
| 2016/0367071 A1 * | 12/2016 | Dollner | ........... | B01F 35/221422 |
| 2017/0079464 A1 * | 3/2017 | Apone | ................ | A47J 31/4496 |
| 2017/0119195 A1 * | 5/2017 | Al-Shaibani | .......... | A47J 31/525 |
| 2017/0164644 A1 * | 6/2017 | Steiner | ................ | A47J 31/4403 |
| 2017/0303732 A1 * | 10/2017 | Balkau | ................ | A47J 31/4485 |
| 2017/0303733 A1 * | 10/2017 | Balkau | .............. | A47J 31/469 |
| 2017/0367525 A1 * | 12/2017 | Buchholz | ............. | A23C 9/1524 |
| 2018/0055277 A1 * | 3/2018 | Arndt | ..................... | A23P 30/40 |
| 2018/0110363 A1 * | 4/2018 | Glucksman | ......... | A47J 31/4403 |

FOREIGN PATENT DOCUMENTS

| | | | | | |
|---|---|---|---|---|---|
| CN | 109068883 A | * | 12/2018 | ......... | A47J 31/4485 |
| CN | 109195489 A | * | 1/2019 | ........... | A47J 31/461 |
| DE | 4445436 A1 | | 6/1996 | | |
| EP | 1501398 A1 | | 2/2005 | | |
| JP | 2008264091 A | | 11/2008 | | |
| JP | 2008545514 A | | 12/2008 | | |
| JP | 2011019910 S | | 2/2011 | | |
| JP | 2013517020 A | | 5/2013 | | |
| JP | 2014213208 A | | 11/2014 | | |
| JP | 2016097306 A | | 5/2016 | | |
| JP | 2017225821 A | | 12/2017 | | |
| WO | 2005074770 A1 | | 8/2005 | | |
| WO | 2008128609 A | | 10/2008 | | |
| WO | 2020254092 A1 | | 5/2020 | | |

* cited by examiner

METHOD FOR PREPARING A BEVERAGE, PREFERABLY MILK FROTH OR HOT MILK

FIELD OF THE INVENTION

The invention relates to a method for preparing a beverage, preferably milk froth or hot milk, in which an initial beverage, preferably cold milk, is filled at least partially into a container before the preparation of the beverage, or the initial beverage is conveyed from a container.

BACKGROUND OF THE INVENTION

For the production of steam, in particular in a coffee machine, the principle is known, as disclosed in the printed publication DE 44 45 436, of controlling the quantity of delivery of steam by way of a simple valve as a manual operating unit. The emission of steam is used essentially for preparing coffee specialties containing milk, such as Cappuccino, Latte Macchiato, or milk coffee, and in this situation for the production of milk froth. The hot steam is conveyed, by way of a lance immersed into the milk, into a cup or container, such that the milk is heated, and the desired milk froth is produced by the upwards and downwards movement of the cup during the ingress of the steam.

A device of this type is also disclosed in EP-A-1 501 398. This consists essentially of a steam generator and a compressed air source, as well as a steam delivery line and, connected to this, a compressed air line, which is extended by the steam lance immersed into the milk. The mixing of the two media, steam and air, therefore already takes place before the steam lance. As a result, it is difficult to adjust the quality of the milk froth, and to change it depending on the type of beverage which is to be prepared. In this situation, devices of this type are nowadays required to satisfy high demands in respect of product quality, although their conditions of use and operation often vary considerably from case to case.

OBJECTS AND SUMMARY OF THE INVENTION

The invention is based on the object of providing a method and device of the type referred to heretofore, with which fresh milk or the like is at least partially filled in a known manner into a container, such as a jug, but, in consequence, milk froth in particular can be produced in best quality for a beverage.

This object is solved according to the invention by a method including conveying a beverage from a container positioned on a station through a part of at least one line leading away from the station to and then through a frothing and/or heating device, i.e., a froth production unit, and then through another part of the at least one line leading to the station back into the container, and repeating the conveying step to provide for circulation of the beverage through the froth production unit until the beverage exhibits a specific temperature and/or consistency when conveyed back into the container. Another method for preparing a beverage, which is preferably milk froth or hot milk derived from, for example, cold milk, includes conveying an initial beverage, i.e., the cold milk, from a container through at least one line to and then through a froth production unit in which froth is produced in the beverage, and then from the froth prediction unit through the at least one line to a chamber. The beverage in the chamber is conveyed therefrom into the at least one line and then to the froth production unit. The conveying steps are repeated, as needed, to provide for circulation of the beverage through the froth production unit until the beverage exhibits a specific temperature and/or consistency in the froth production unit. Once the beverage exhibits the specific temperature and/or consistency in the froth production unit, the beverage is conveyed from the froth production unit to an outlet.

With this method according to the invention, a container can be used by the operator in an inherently conventional manner for the preparation of the beverage, since in this way the beverage can be prepared manually and individually for the guest in accordance with his preferences, while the milk froth or the like can be produced and served constantly with the same and high quality.

The invention makes provision in this situation for the beverage filled in the container, positioned on a standing surface of a station, to be conveyed through at least one line, leading away from the station, to a device for preparing, preferably, milk froth or hot milk, and back into the container, and this circulation is repeated, preferably until the beverage exhibits a specific temperature and/or consistency.

This device is provided with a froth production unit, which comprises at least one line leading away from the station, a pump suctioning the milk or the like out of container and conveying it, an air inlet, at least one choke, and a heating means which can be switched on and off, for the milk or the like. The circulating line is guided back to the station, and makes it possible for the milk or the like which has been prepared to be led back again into the container.

With one preferred embodiment of this arrangement, the invention makes provision for this device to be a constituent part of a coffee machine, which is placed out of sight beneath the table. As a result, the arrangement is practically invisible to the customer or consumer using it.

As an alternative to this, the coffee machine equipped with the device can be placed so as to be easily accessible on a counter or table. This allows, among other things, for the direct actuation of the coffee machine, as a result of which handling is made easier.

BRIEF DESCRIPTION OF THE DRAWINGS

The invention and its further advantages are explained in greater detail hereinafter on the basis of exemplary embodiments and making reference to the Figures. The Figures show.

DETAILED DESCRIPTION OF THE INVENTION

Figure 1:
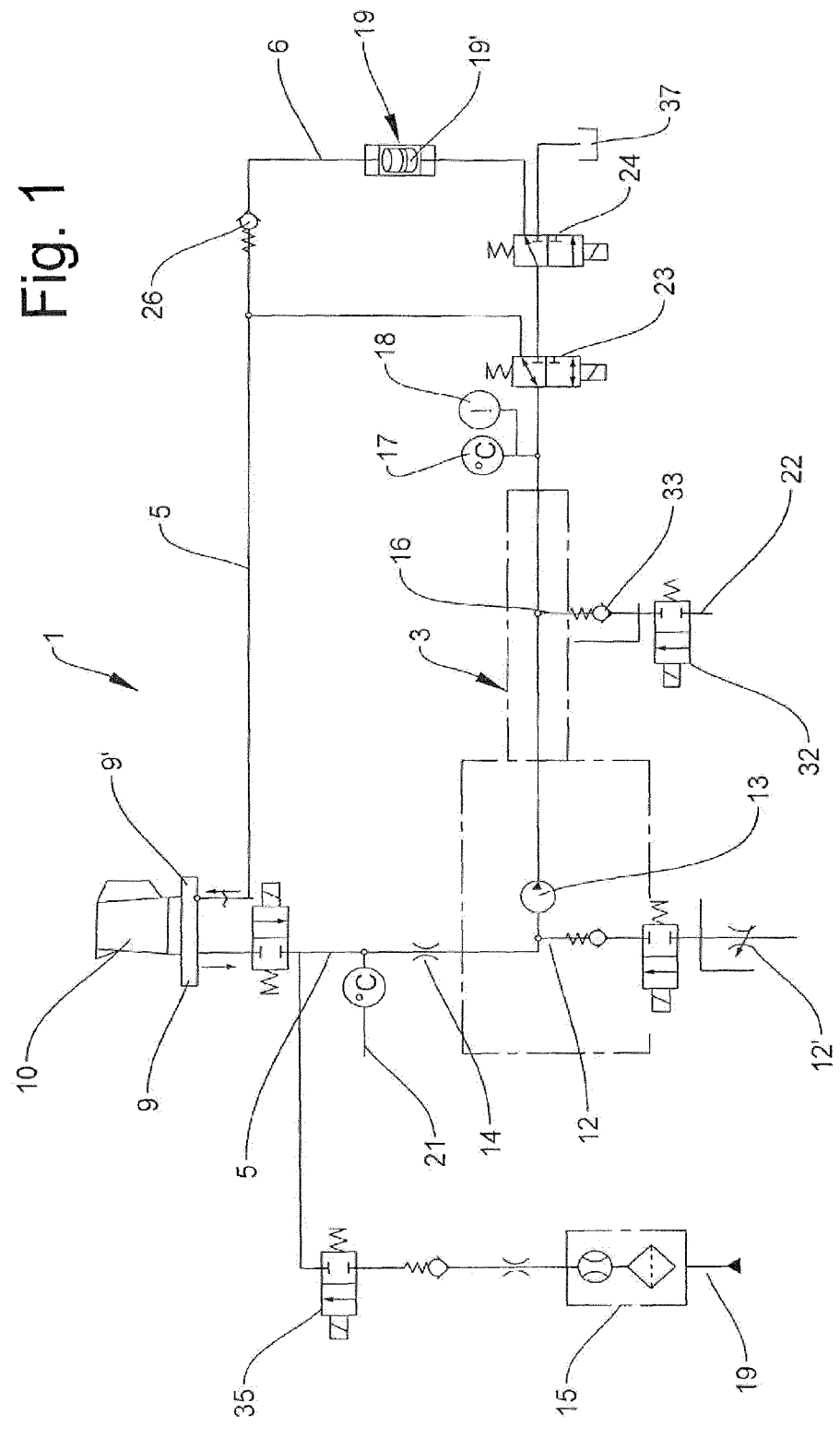
FIG. 1 is a hydraulic schematic of a device according to the invention, with a station and a container standing on it.

The device 1 shown in FIG. 1 for preparing a beverage is constructed as a separate milk preparation module, or integrated in a coffee machine. With this device 1, hot milk, cold or hot milk froth, or a milk mixture for Cappuccino, Latte Macchiato, chocolate, vanilla, or other beverages are made.

With this device 1, provision is preferably made for a standing surface 9' on a serving table, or, with a coffee machine, for a container 10 which can be put in place by hand. As the container 10, a metal milk jug is being used. Use could also be made of a milk jug or a vessel made of porcelain, or a cup or the like. This container 10 can be raised from the station 9 or set down on it, wherein corresponding centering means, such as centering bolts, make possible the exact positioning of the container on the station.

With the method according to the invention, the filled beverage in the container 10, positioned on the standing surface 9' of a station 9, is conveyed through a line 5 leading away from the station 9 to the device 1 for preparing preferably cold or hot milk froth or hot milk, and then conveyed back into the container 10. This circulation of the beverage which is to be prepared, from the container through the line, through the device, and back to the container is automatically repeated until the beverage exhibits a specific temperature and/or consistency. This could, however, in principle also be controlled as a dependency of time and/or quantity.

This froth production unit 3 of the device 1 for heating the milk or producing cold or hot milk froth consists essentially of a line 5 leading away from the station 9 on the table, a temperature sensor 21, a choke 14 from a pump 13 conveying the beverage, and, upstream or downstream of this, an air intake 12. Arranged following this is a connection element 16, connected to the steam line 22, leading at a right angle into the line 5, for the delivery of the steam, a temperature measuring device 17, and a mixed froth consistency measuring device 18. The line 5 is then guided back to the station 9.

This milk froth consistency measuring device 18 is advantageously formed by an electrical sensor, with which the electrical conductivity or electrical resistance of the flowing milk froth is measured. It would also be possible to do without this measuring device 18, however, and, in order to attain a desired consistency of the beverage containing froth, its temperature is determined with the temperature measuring device 17, and on the basis of this temperature the revolution speed of the pump 13 is adjusted by regulating or controlling in such a way that a reference temperature can be adjusted, and therefore also this desired consistency. This could also be attained, however, by controlling the quantity of air introduced via the air inlet 12, by means of a proportional valve 12'.

This device 1 comprises a heating assembly with a steam line 22 for heating the beverage, for example by means of steam, which can be delivered in a controlled manner from a boiler, which is not shown in any greater detail. The steam line 22 leads via a closure valve 32, actuated by a corresponding control unit, and a non-return valve 33, into a line 5 of the froth producing unit 3, through which the milk or the like circulates. The hot steam is introduced through this steam line 22 into the beverage flowing in the line 5 in such a way that the beverage is heated rapidly.

The device 1 is further shown with a water feed for cleaning, with a delivery line 19 leading into the line 5, a filter unit 15, and a valve 35. Also provided for this cleaning is a two-way valve 23 for a loop of the line 5 through an additional line 6 with a cleaning medium inlet 19, and also a non-return valve 26.

During the cleaning of the froth production unit 3, the line 5, and the container 10, the valves 35, 23 are switched in such a way that water is suctioned into the line 5 by means of the pump 13, and a circuit is formed through the line 6 with the cleaning medium inlet 19, for example with cleaning tablets 19', through the line 5, the container 10, and back again through the pump 13 into the line 6, and the water is therefore circulated. At the end of the cleaning process, the two-way valve 24 can be opened, and the cleaning water flows away into a catchment container 37.

Advantageously, cleaning is often carried out only with water without the involvement of the line 6, wherein the water is circulated via the line 5 through the froth production unit 3 and the container 10, and is then guided into the catchment container 37.

Figure 2:
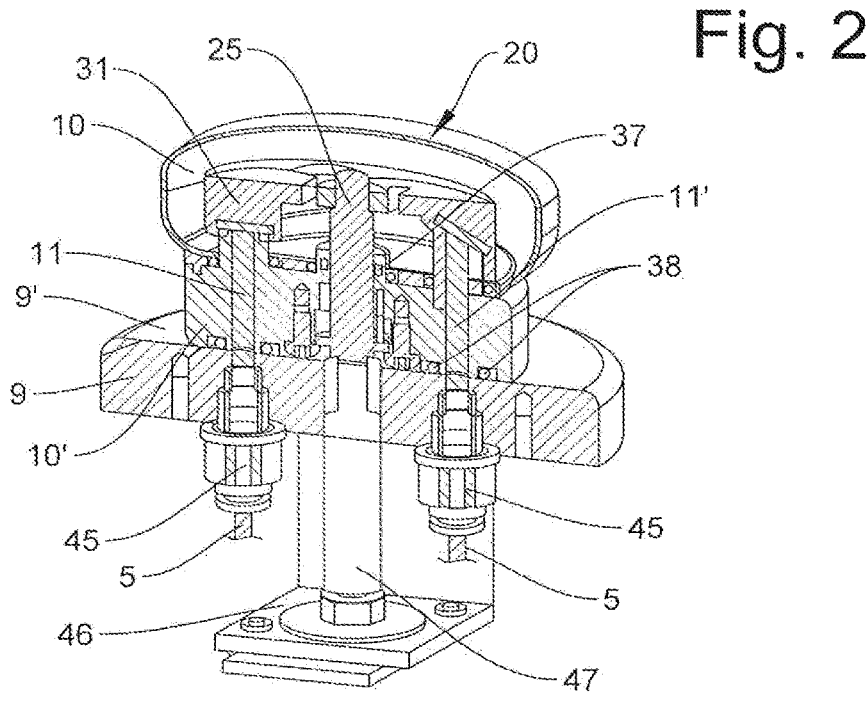
FIG. 2 is a longitudinal section of the station and the container standing on it, with closed passage openings.
Figure 3:
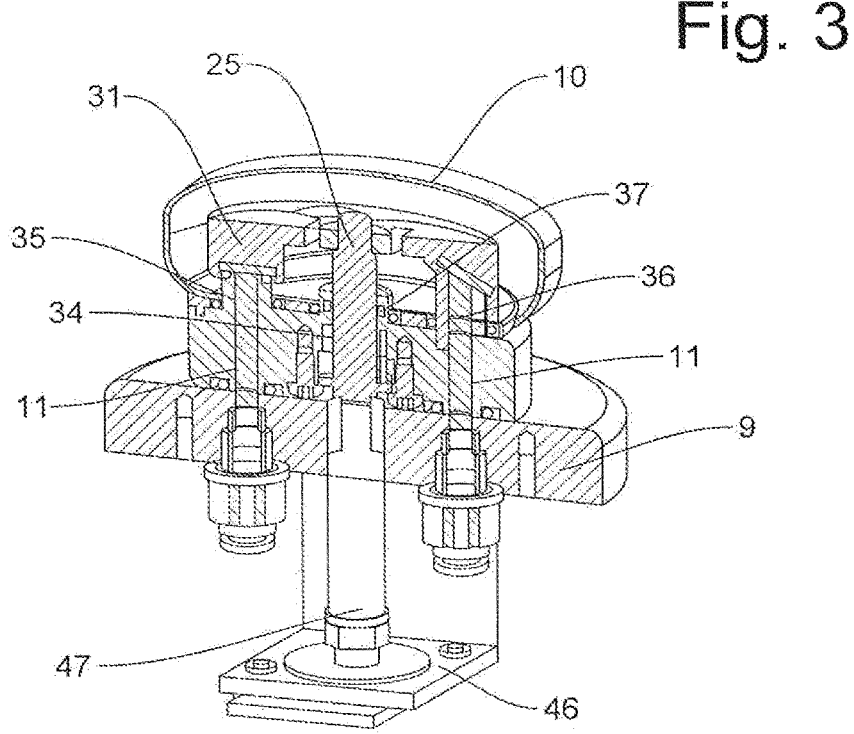
FIG. 3 is the longitudinal section according to FIG. 2, with open passage openings.

According to FIG. 2 and FIG. 3, the container 10 shown in the lower part contains a wall and a base 10', with two passage openings 11, 11' running next to one another, and a closure element assembly 20. This closure element assembly 20 is composed of a vertical axis element 25, subjected to preliminary tension by means of a pressure spring 34, a closure element 31 secured to the top of the vertical axis element 25, and, projecting so as to correspond to this, an inlet 36 and outlet 35 for the passage openings 11, 11'. In addition to this, corresponding sealing elements 37, 38 arranged in the base 10', which ensure that the container 10 is tightly sealed when the beverage is filled into it and it stands on the station 9.

Provided in the station 9 are line connections 45 for connecting the passage openings 11, 11' to the lines 5, and a lifting device 46 with a piston 47 is provided, which is vertically adjustable and comes in contact with the lower face side of the vertical axis element 25 in the container 10. This piston 47 can be moved by the lifting device 46 in a controlled manner into two positions, and has the effect that the closure element 31 of the closure element assembly 20 in the interior of the housing can be positioned by way of this vertical axis element 25 into a closed position or open position, as can be seen in FIG. 2 and FIG. 3 respectively. This pressure spring 34 taking effect on the vertical axis element 25 makes it possible for the closure element 31, with the vertical axis 25, to move automatically into the closed position, and therefore the container is always closed when it is not intended that the beverage should circulate.

In this way, preferably a certain selectable quantity of cold milk or a milk mixture can be filled as required into this container 10, represented as a jug. After the jug has been set down on the station 9, the cold milk is suctioned out of it, and, by way of the circulations, provided for example as cold or hot milk froth. In this way, an excellent milk froth can be produced in seconds. The operator can therefore prepare the beverages more rapidly than if the milk or the like must be produced by a conventional steam lance inserted into the jug on the coffee machine, manually, by hand movements. Added to this is the fact that a person who orders the beverage and is standing next to the table does not see, and also does not perceive, that, for example, milk froth is being produced in the jug standing on the station 9.

Figure 4:
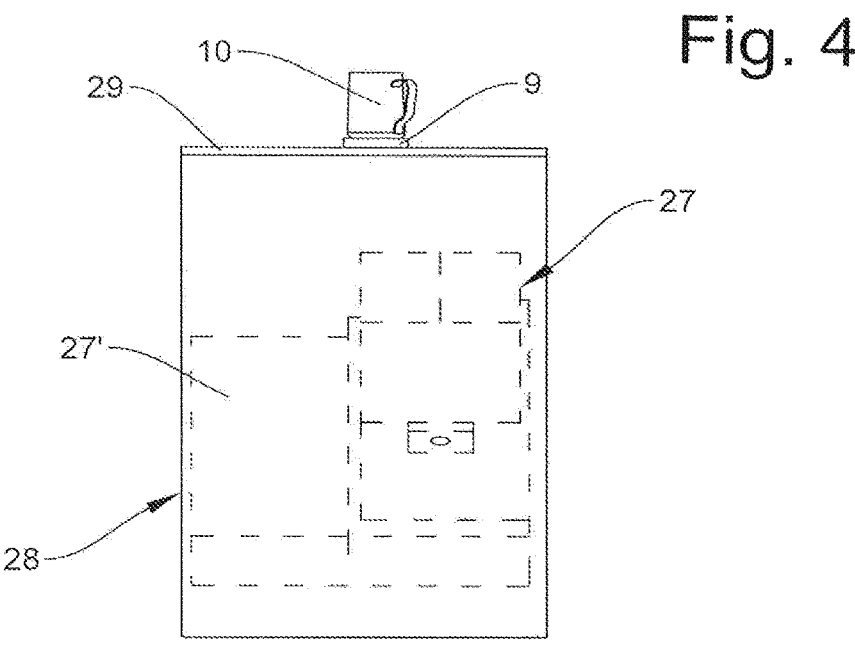
FIG. 4 is a partial view of a service table with the station and the container standing on it, and with a coffee machine indicated among the table furniture items.

With the exemplary embodiment according to FIG. 4, the device 1 according to the invention, as a separate milk preparation module, and also a coffee machine 27 and an associated refrigerator 27', are accommodated in a table furniture unit 28. A station 9 connected to the device 1 is mounted on a table plate 29. The coffee machine 27, explained hereinafter, has an outlet, not visible, above the table plate 29, which can be provided with a column or similar element. In addition to this, advantageously, the hot steam required in the device 1 is produced in the coffee machine 27, which are connected to one another by a steam delivery line, not shown in any greater detail.

Figure 5:
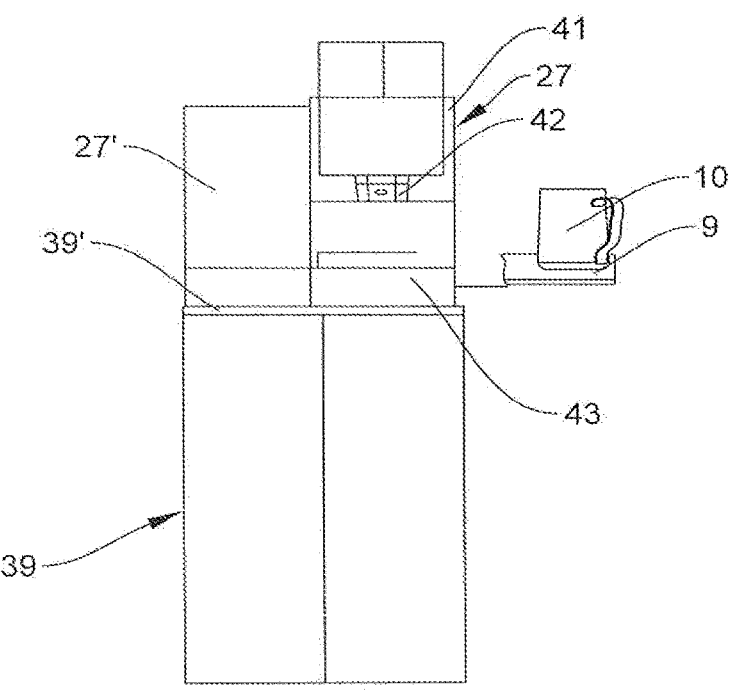
FIG. 5 is a schematically represented coffee machine, with a station placed next to it, and a container standing on it.

FIG. 5 shows a variant with which the coffee machine 27 is free-standing on a surface 39' of a counter 39, a table, or the like, and this station 9, with the container 10 which can be placed on this, is arranged next to the coffee machine 27, wherein the device 1, not visible, is integrated into the coffee machine 27. Of the coffee machine 27, shown only in principle, there can be seen the housing 41, on the front side the outlet(s) 42 for the coffee, on the upper side a coffee bean container, and a drip tray 43 beneath, on which can be stood a cup or the like for filling with coffee and/or milk or milk froth. Next to the coffee machine 27 and the drip tray 43, advantageously, this station 9 is placed laterally, which is provided with the lines of the device 1 passing into the interior of the housing 41 of the coffee machine 27.

This method and device according to the invention for the heating of milk can be used both with a milk module as a separate unit, or, as explained heretofore, can be integrated in a coffee machine, in particular for producing Cappuccino or other hot milk beverages.

Figure 6:
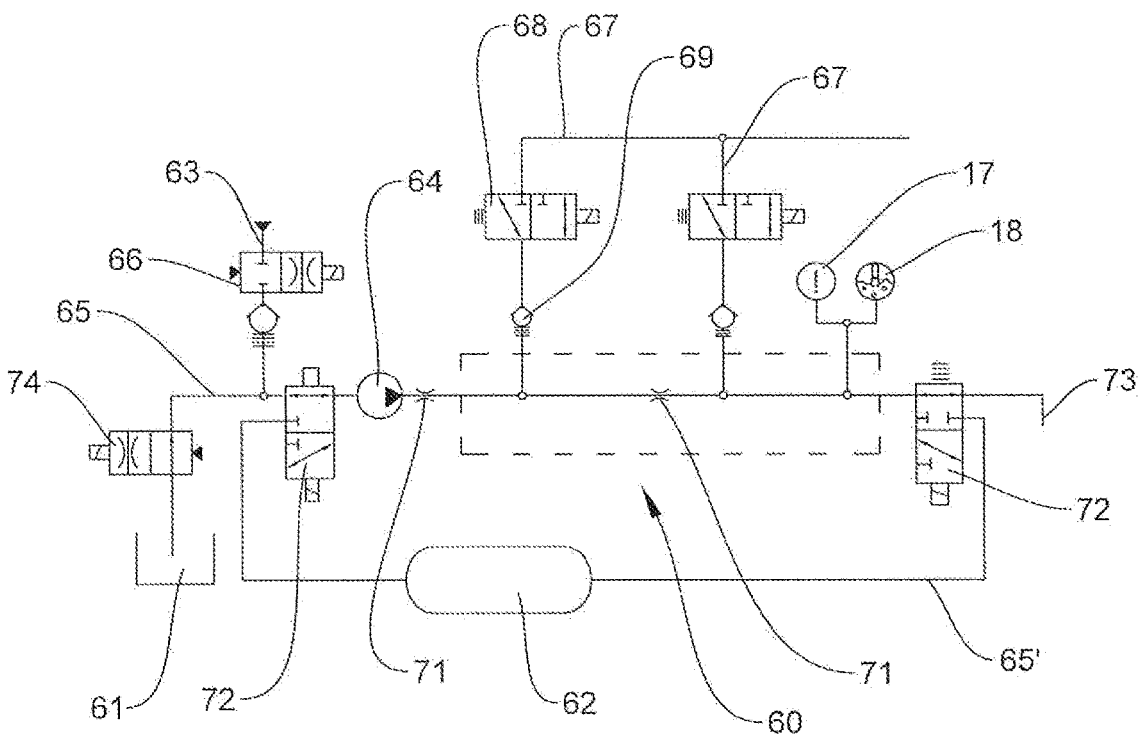
FIG. 6 is a hydraulic schematic of a device according to the invention, with a container for the delivery of the beverage.

With a further variant according to FIG. 6, the beverage is not conveyed from a container 10 which can be set in place, but from a container 61, in a known manner to a device which is configured in a similar manner to that according to FIG. 1, and from this there is a connection to an outlet 73, beneath which, for example, a cup can be placed. In this situation, the milk is suctioned through a suction line 65 by a controllable pump 64, such as a gear pump. In addition to this, an air delivery line 63 with a switchable air control valve 66 is arranged upstream of the pump 64, and hot steam is conveyed as a heating medium through two steam lines 67, each provided with a closure valve 68 and a non-return valve 69, transversely into this suction line 65, wherein it would also be possible for only one steam line 67 to be provided. In addition, chokes 71 are advantageously provided downstream of the pump 64 in the suction line 65.

According to the invention, the beverage is conveyed by the line 65, leading away from the container 61, into the froth production unit 60, for the preparation of the beverage, preferably of milk froth or hot milk, from which, via a line 65', it is conveyed into a chamber 62 and then back into the froth production unit 60, and this circulation is repeated preferably until the beverage exhibits a specific temperature and/or consistency, and, following this, the beverage is conveyed to the outlet 73.

For this purpose, in each case a two-way valve 72 is arranged in the line 65, upstream and downstream of the pump 64, through which the beverage is conveyed either via the line 65' into the chamber 62 for this circulation or this loop, or is conveyed directly to the outlet 73. From this chamber 62, the cold or hot milk mixture is then again suctioned by the pump 64, via the two-way valve 72, and, depending on the situation, is again conveyed either into the chamber 62 or to the outlet 73. The chamber 62 is preferably dimensioned in such a way that the beverage portion which is to be prepared corresponds at least approximately to that portion which is required for the cup or container which has been provided at the outlet 73. This beverage portion is determined by a controlled opening or closing of a valve 74 in the line 65.

Furthermore, a temperature measuring device 17 or a consistency measuring device 18 respectively is arranged in the froth production unit 60, which, depending on the measurement, by means of a corresponding control unit, can cause the two-way valves 72 to be switched.

This device according to FIG. 6 is integrated in a coffee machine or in a separate milk froth producer, and allows for the production of high quality milk froth in a cold or hot state.

It is of course possible for the invention to be explained by way of other exemplary embodiments. For example, instead of a steam source as the heating medium, another form of heating of the beverage can be provided, for example by means of a known water heater or the like.

The at least one, or both, passage opening(s) provided in the container could also be arranged in its side wall.

In principle, it would also be possible for hoses to be used in the container instead of the passage openings and the closure element, which are immersed into the container. These hoses would then be provided with closure valves having the same effect.

The invention claimed is:

1. Method for preparing a beverage, comprising:
conveying a beverage from an interior of a container positioned on a station through a part of at least one line leading away from the station, to and then through a froth production unit, and then through another part of the at least one line leading to the station back into the container, the step of conveying the beverage comprising:
conveying the beverage from the interior of the container through a first passage opening in a base of the container in a downward direction into the part of the at least one line leading away from the station, and
conveying the beverage from the another part of the at least one line leading to the station through a second passage opening in the base of the container only in an upward direction into the interior of the container such that the beverage enters directly into the interior of the container from the second passage opening;
configuring the station and the container such that when the container is placed onto a standing surface of the station, the first and second passage openings are automatically connected to the part of the at least one line and the another part of the at least one line, respectively,
providing a closure element to selectively open and close the first and second passage openings, and
repeating the conveying step to provide for circulation of the beverage through the froth production unit until the beverage exhibits a specific temperature and/or consistency when conveyed back into the container.

2. Method according to claim 1, further comprising:
integrating a device that performs the step of conveying the beverage in a service table or coffee machine, and
integrating the froth production unit in the service table or coffee machine.

3. Method according to claim 1, further comprising:
measuring temperature of the beverage after the froth production unit, and
adjusting revolution speed of a pump that conveys the beverage through the at least one line and through the froth production unit based on the measured temperature.

4. Method according to claim 1, wherein the step of conveying the beverage further comprises conveying the beverage through line connections in the station that connect the first and second passage openings of the container to the at least one line.

5. Method according to claim 1, further comprising at least partially filling the container with the beverage when the container is not on the station and then placing the at least partially filled container on the station.

6. Method according to claim 1, wherein the beverage in the container is initially milk that has not been frothed or heated and a resultant beverage in the container after the conveying step is milk froth or heated milk.

7. Method according to claim 1, wherein the closure element is part of a closure element assembly, further comprising subjecting the closure element assembly to tension using a pressure spring whereby the closure element assembly moves automatically into a closed position.

8. Method according to claim 1, further comprising coupling the closure element to a lifting device to enable the closure element to move between a position in which the first and second openings are closed and a position in which the first and second openings are open.

9. Method according to claim 1, wherein the steps of conveying the beverage from the interior of the container through the first passage opening into the part of the at least one line and the step of conveying the beverage from the another part of the at least one line through the second passage opening only in an upward direction into the interior of the container comprises providing a pump in the at least one line.

10. Method according to claim 9, wherein the pump is situated between the first passage opening and the froth production unit in a flow direction of the beverage.

11. Method according to claim 1, wherein the step of conveying the beverage from the another part of the at least one line leading to the station through the second passage opening into the interior of the container comprises terminating the another part of the at least one line at the base of the container such that the beverage flows into the interior of the container upward from the base of the container.

12. Method for preparing a beverage, comprising:
providing a first line through which the beverage flows from a container to an outlet, the first line passing through a froth production unit in which froth is produced in the beverage;
providing a second line including a chamber, the second line having an adjustable inlet from the first line between the froth production unit and the outlet, and an adjustable outlet into the first line between the container and the froth production unit;
conveying the beverage from the container through the first line to and through the froth production unit in which froth is produced in the beverage, and then from the froth production unit through the second line to the chamber;
conveying the beverage from the chamber into the first line and then again to and through the froth production unit; and then if the beverage exhibits a specific temperature and/or consistency in the froth production unit, conveying the beverage from the froth production unit to the outlet without being further directed into the second line; and
if the beverage does not exhibit a specific temperature and/or consistency in the froth production unit, repeating the conveying steps to provide for circulation of the beverage into the second line and through the chamber and then back to the first line to and through the froth production unit.

13. Method according to claim 12, further comprising:
integrating a device that performs the conveying steps in a service table or coffee machine, and
integrating the froth production unit in the service table or coffee machine.

14. Method according to claim 12, further comprising:
measuring temperature of the beverage in the first line in the froth production unit using a temperature measuring device or measuring consistency of the beverage in the first line in the froth production unit using a consistency measuring device, and,
adjusting a valve to direct the beverage through the first line to the outlet or to the second line and then to the chamber based on the measured temperature or measured consistency of the beverage in the first line.

15. Method according to claim 12, further comprising dimensioning the chamber to have a same portion as a cup or a container placed at the outlet.

16. Method according to claim 12, wherein the beverage in the container is initially milk that has not been frothed or heated and a resultant beverage at the outlet is milk froth or heated milk.

17. Method according to claim 14, wherein the valve defines the inlet of the second line.

18. Method according to claim 12, further comprising:
controlling a valve in the first line to direct the beverage from the container through the first line to the froth production unit, the valve defining the outlet of the second line to the first line.

19. Method according to claim 12, further comprising:
controlling a first valve in the first line that defines the inlet of the second line to alternatively direct the beverage through the first line to the outlet or to the second line and then to the chamber; and
controlling a second valve in the first line to alternatively direct the beverage from the container through the first line to the froth production unit or from the second line into the first line, the second valve defining the outlet of the second line to the first line.

* * * * *